(12) United States Patent
Krenz

(10) Patent No.: US 12,119,661 B2
(45) Date of Patent: Oct. 15, 2024

(54) SYSTEMS AND METHODS FOR POWER TRANSFER AND LOAD MANAGEMENT

(71) Applicant: Hamilton Sundstrand Corporation, Charlotte, NC (US)

(72) Inventor: Michael Krenz, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 341 days.

(21) Appl. No.: 17/521,654

(22) Filed: Nov. 8, 2021

(65) Prior Publication Data

US 2023/0148132 A1  May 11, 2023

(51) Int. Cl.
*H02J 3/46* (2006.01)
*B64D 31/00* (2024.01)
*H02J 3/00* (2006.01)
*H02J 3/28* (2006.01)

(52) U.S. Cl.
CPC ............... *H02J 3/46* (2013.01); *B64D 31/00* (2013.01); *H02J 3/003* (2020.01); *H02J 3/28* (2013.01); *B64D 2221/00* (2013.01); *H02J 2310/44* (2020.01)

(58) Field of Classification Search
CPC ...... H02J 3/003; H02J 3/28; H02J 3/46; H02J 2310/44; B64D 31/00; B64D 2221/00
USPC ........................................................ 307/75
See application file for complete search history.

(56) References Cited

U.S. PATENT DOCUMENTS

| 10,879,727 | B1 * | 12/2020 | Cooper ................... H02J 9/062 |
| 2015/0360630 | A1 | 12/2015 | Rideau et al. |
| 2019/0315480 | A1 | 10/2019 | Elliott et al. |
| 2019/0315481 | A1 | 10/2019 | Elliott |
| 2020/0331624 | A1 | 10/2020 | Sheffield et al. |

FOREIGN PATENT DOCUMENTS

| CN | 102388522 B | 9/2015 |
| CN | 111682596 A | 9/2020 |

OTHER PUBLICATIONS

Extended European Search Report issued in corresponding EP Patent Application No. 22205634.3 on Mar. 24, 2023.

* cited by examiner

*Primary Examiner* — Hal Kaplan

(57) ABSTRACT

In accordance with at least one aspect of this disclosure, a method for power distribution and load management in an aircraft can include budgeting a designated current for one or more loads in one or more respective power districts in a power distribution system based on a nominal load draw for each of the one or more loads, determining a system condition of the power distribution system, prioritizing each of the one or more loads based on the system condition, and distributing power from each of the one or more power districts to the respective one or more loads in order of priority until a total budgeted designated current for the respective power district has been exhausted, and leaving any remaining loads in the one or more power districts unpowered.

17 Claims, 1 Drawing Sheet

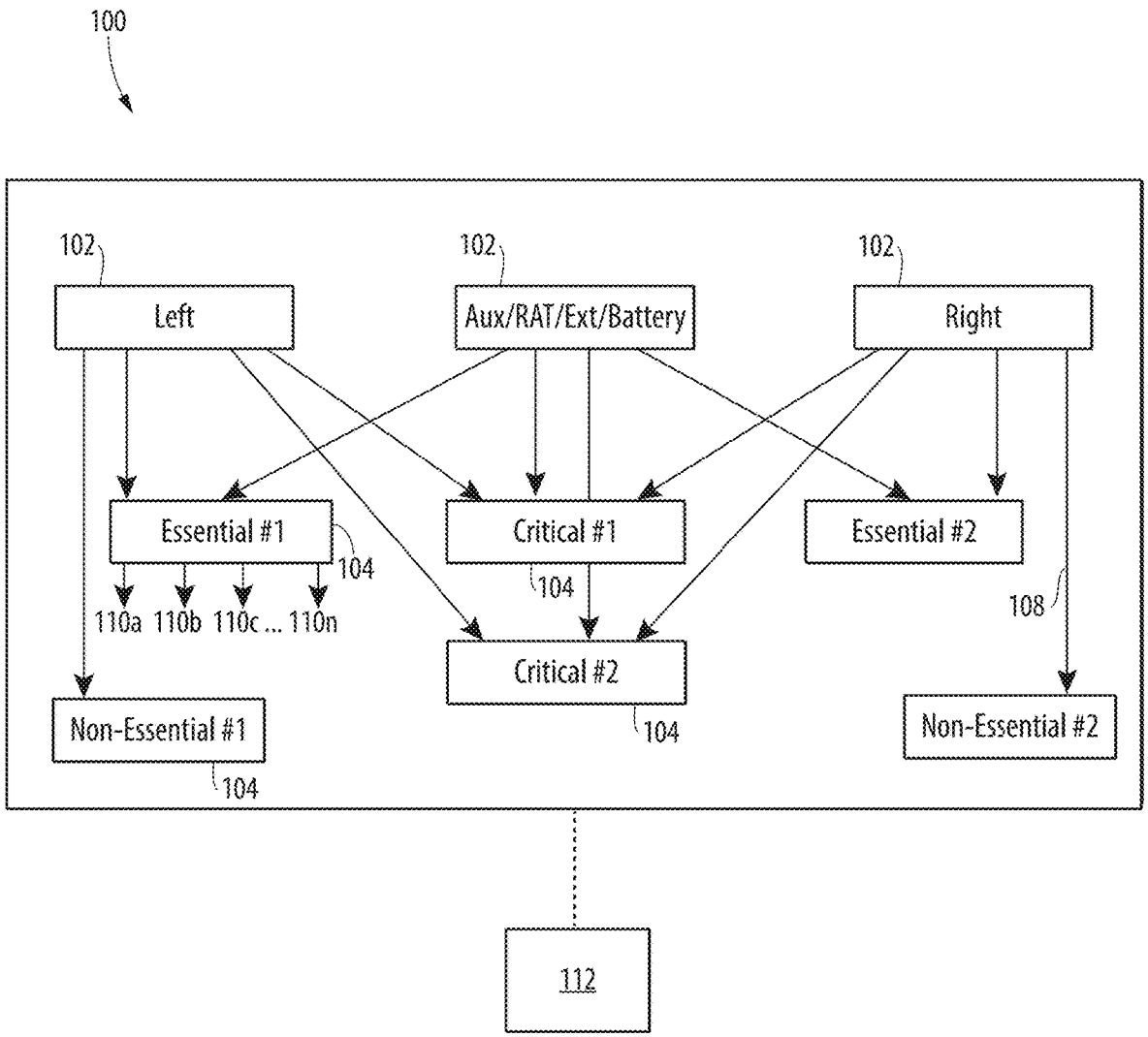

SYSTEMS AND METHODS FOR POWER TRANSFER AND LOAD MANAGEMENT

TECHNICAL FIELD

The present disclosure relates to power distribution and load management, e.g. for use in aircraft electrical systems.

BACKGROUND

Managing which sources of power feed various loads in a micro-grid environment such as an aircraft can often become very complex. For example, some loads may have varying criticality depending upon phase of flight, some loads may require different types and levels of power, some loads may favor "onside" power sourcing for fault segregation, while others may require dual or triple simultaneous sourcing. Typically, systems may utilize software to monitor the power system and control the linkage between power sources and loads, however in some cases, this can be highly complex, hard to maintain, and very expensive to certify.

There is always a need in the art for improvements to power distribution and load management in the aerospace industry. This disclosure provides a solution for this need.

SUMMARY

In accordance with at least one aspect of this disclosure, a method for power distribution and load management in an aircraft includes budgeting a designated current for one or more loads in one or more respective power districts in a power distribution system based on a nominal load draw for each of the one or more loads. The method includes determining a system condition of the power distribution system and prioritizing each of the one or more loads based on the system condition. The method further includes, distributing power from each of the one or more power districts to the respective one or more loads in order of priority until a total budgeted designated current for the respective power district has been exhausted, and leaving any remaining loads in the one or more power districts unpowered.

In embodiments, distributing power from each of the one or more power districts to the respective one or more loads in order of priority can include distributing power to a subsequent load based on an expected load draw for the respective load during the determined system condition.

In certain embodiments, the method can further include measuring an actual load draw for each respective load, such that distributing power from each of the one or more power districts to the respective one or more loads in order of priority can include distributing power to a subsequent load based on the actual load draw for the respective load during the determined system condition. In certain such embodiments, if all prioritized loads within the respective power district receive their total respective current based actual current needed, and the total budgeted designated current for the respective power district has not been exhausted, the method can include distributing power from each of the one or more power districts to one or more additional loads until the total budgeted designated current for the respective power district has been exhausted.

In embodiments, the budgeted designated current for each of the one or more loads can be constant, regardless of the determined system condition. In embodiments, prioritizing each of the one or more loads based on the system condition can include, prioritizing each of the one or more loads based on a system health state. In certain embodiments, prioritizing each of the one or more loads based on the system condition can include, prioritizing each of the one or more loads based on a flight phase.

In embodiments, if a respective one or more load is not used during a respective system condition the method can include prioritizing the respective load as non-priority such that no power is distributed to the respective load, regardless of whether the total budgeted designated current for the respective power district has been exhausted.

In embodiments, the method can include generating a look-up table for each the one or more power districts configured to be used by a logic module to control power distribution and load management based at least in part on the look-up table. In certain such embodiments, the look-up table can include, at least one of: a load identifier, a load indexer, a load priority based on the determined system condition, a load priority based on a flight phase, and/or the budgeted designated current for each of the one or more loads.

In certain embodiments, budgeting a designated current for one or more loads and prioritizing each of the one or more loads based on the system condition can be performed automatically by a computer using a logic module. In certain such embodiments, the logic module can include a static engine configured to execute one or more parameter data item files. In certain embodiments, the method can include receiving budget and priority input from a user, and at least one of budgeting a designated current for one or more loads and/or prioritizing each of the one or more loads based on the system condition can be based on the input from the user.

In accordance with at least one aspect of this disclosure, a non-transitory computer readable medium having can have a file stored therein, In embodiments, the file can include computer executable instructions configured to perform a method as described herein. In certain embodiments, the file can include one or more parameter data item files.

In accordance with at least one aspect of this disclosure, an aircraft power system can include one or more power distribution sources configured to supply electrical power to one or more power districts, one or more loads housed within a respective one or more power district, where the power district is configured to manage draw by each respective one or more loads within the respective power district, and a logic module including machine readable instructions.

In embodiments, the machine readable instructions can be configured to cause the module to budget a designated current for each of the one or more loads in the respective one or more power districts in the power system based on a nominal load draw for each of the one or more loads, determine a system condition of the power system, prioritize each of the one or more loads based on the system condition, and distribute power from each of the one or more power districts to the respective one or more loads in order of priority until a total budgeted designated current for the respective power district has been exhausted.

In embodiments, the logic module can include a static engine configured to execute one or more parameter data item files. In embodiments, the machine readable instructions can be configured to cause the module to generate a look-up table for each the one or more power districts to control power distribution and load management based at least in part on the look-up table. The look-up table can include, at least one of: a load identifier, a load indexer, a load priority based on the determined system condition, a load priority based on a flight phase, and/or the budgeted designated current for each of the one or more loads.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

The FIGURE is a schematic diagram of a power system in accordance with this disclosure, showing an interconnection between power distributors, power districts, and loads.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in the FIGURE and is designated generally by reference character 100. Other embodiments and/or aspects of this disclosure can be seen in Table 1 and Table 2.

An aircraft power system 100 can be similar to that of a micro grid, where power is first generated (e.g., via primary distributors 102), then distributed to power districts 104 via busses and over transmission lines 108. Within each power district 104, the power can then be used by any number of loads 110. Each power district 104 receives an allocated amount of power, from any number of primary distributors 102, depending on the respective need of the power district 104. Controlling how much power is sent to each district 104, and from how many primary distributors 102 is controlled by solid state control software, through a combination of controlling switches and breakers. For example, the primary power panels 102 distribute the power from the sources, where each distribution line can be separately controlled by a switch. In certain instances (such as described herein), high voltage direct current can be used for primary distribution, and back-feed from the power districts can be prevented by a diode-like device on the input from each primary source 102 to the district 104. The management of load draws within the power districts 104 can be similarly managed. Typically, there is continuous monitoring of the power distribution system 100 so that in the event of a fault, the switches are controlled to protect downstream electronics (e.g., loads 110).

Additionally, the power can be managed in such a manner so that if there is a failure of a primary source 102, the power can be redistributed accordingly to the respective power districts 104 and loads 110 as needed. However, determining which primary distributor 102 should feed the power district 104 at a given time, and for a given state of the power system 100 can be a challenge. The systems and methods provided herein allow for active control of the primary distributors 102, and redistribution of power based on the given state of the power system 100, and active prioritization of the loads 110 within the district 104 if there is insufficient power to power all loads in the district 104.

In accordance with at least one aspect of this disclosure, an aircraft power system 100 can include one or more power distribution sources 102 configured to supply electrical power to one or more power districts 104. The power distribution sources can include any suitable generator, such as engine generators, auxiliary power units, ram air turbines, batteries, or in certain instances, external generators. One or more loads 110 can be housed within a respective one or more power districts 104. Each power district 104 can be configured to manage the respective load draw by each respective one or more loads 110 within the respective power district 104.

There are two fundamental functions that need to be performed by the aircraft power system 100. Power transfer, which generally refers to the functionality used to manage which sources of power are routed to each load (e.g., from which generator to which district), and load management, which generally refers to the functionality that prioritizes the loads, within each district, if not enough power is available to satisfy all the loads.

Therefore, the aircraft power system 100 can include a logic module 112 including machine readable instructions configured to perform both, power transfer and load management within the power system 100. In embodiments, the machine readable instructions can be configured to cause the logic module 112 to budget a designated current for each of the one or more power districts 104 and each of the one or more loads 110 in the respective one or more power districts 104 based on a nominal load draw for each of the one or more loads 110.

The logic module can determine a system condition of the power system 100 and then prioritize each of the one or more loads 110 within the district 104 based on the system condition. The system condition can include a system health state and/or a flight phase (as discussed further below), among others. Using the determined system condition, and prioritized loads, the logic module can then control the switching mechanisms to distribute power from each of the primary sources 102 to the power districts 104, and manage load draw from the one or more power districts 104 to the respective one or more loads in order of priority until a total budgeted designated current for the respective power district 104 has been exhausted.

In doing so, the logic module 112, whether alone, or based on some external input from a user, can generate a look-up table for each the one or more power districts 104 configured to be used by the logic module 112 when controlling power distribution and load management based at least in part on the look-up table. In embodiments, the look-up table can include, at least one of a load identifier (e.g., a name, number, or description), a load indexer (e.g., the number of the load within the district 1-n representing a count of loads within the district), a load priority based on the determined system condition, a load priority based on a flight phase, and/or the budgeted designated current for each of the one or more loads. Additionally, each power district 104 can be included in the look-up table, where each district 104 is prioritized and budgeted a respective current to be fed from its respective primary distributors 102.

In certain embodiments, in accordance with at least one aspect of this disclosure, a non-transitory computer readable medium can have one or more files stored therein. The file(s) can include the computer executable instructions, which are configured to perform a method, or configured to cause the logic module to perform a method. The method can be a method for power distribution and load management as described herein. The method can first include budgeting a designated current for each power district 104 and for each load 110 in each power district 104. Once a budget is set, the method can then include determining a system condition of the power distribution system 100 (e.g., a system health state or flight phase), and prioritizing each of the one or more districts 104 and loads 110 based on the system condition.

After the system condition has been determined by logic module 112, and the correct set of load management tables has been selected, a second optimization step may be taken. The method then can include distributing power from each of the one or more power districts to the respective one or more loads in order of priority until a total budgeted designated current for the respective power district has been exhausted, and leaving any remaining loads in the one or more power districts unpowered. In certain embodiments, distributing power until the budgeted current is exhausted can be based on an expected current for each load. In this case, each load will receive its budgeted current, and there will be no leftover power once each prioritized load has been powered.

In certain embodiments, the method can include measuring (e.g., using current sensors) an actual load draw for each respective load 110. The load sensing of the active loading can determine the amount of power being consumed by the loads that are turned on at a given time. In this case, the distribution of power from the power districts 104 to the respective loads 110 can include distributing power to a subsequent load based on the actual load draw for the respective load during the determined system condition. When based on measured actual load draw, it is possible for there to be a surplus of power in the district 104, where the budgeted power may include a margin above the actual needed current. For example, a load may be budgeted 5 A, but only consumes 1 A continuous with a 3 A peak. By measuring the power being consumed, it may be possible to further re-allocate "left over" power to other loads 110.

If all prioritized loads within the respective power district 104 have received their total respective current based actual current needed, and the total budgeted designated current for the respective power district 104 has not been exhausted, the method can then include distributing power from the respective power district 104 that has the surplus to one or more additional loads within that district 104 until the total budgeted designated current for the respective power district 104 has been exhausted. If there is still power left over, it may be possible to distribute the power to another district 104. The one or more additional loads can include low priority loads that would have remained unpowered if the distribution was based on expected draw. It is also contemplated that a mix of the two methods factoring the actual power with the budgeted power may also be used.

Because the budgeted designated current for each of the one or more loads 110 is based on a nominal draw, it remains constant, regardless of the determined system condition. It should be understood by those having ordinary skill in the art that the budget for each load is not necessarily the breaker rating of the load 110, often times the breaker ratings can be higher than budget. The budget should represent the expected load draw on a nominal basis. The budgets for each load can be determined by a system administrator, and can be hard coded into the file as a known, constant value, unless the load 110 is physically changed in some manner, for example. In order to actually control the distribution using the budgeted currents, the respective primary distributors 102 can then communicate the budgeted amount of power to the respective power district 104 for the current system health state, and the power districts 104 can then use this budget to allocate and prioritize power to the loads 110, for example using module 112.

Prioritizing of each load, on the other hand, can be variable. Prioritizing each of the one or more loads 110 based on the system condition can include prioritizing each of the one or more loads based on the system health state. The system health state can describe any number of conditions, including which power sources are functioning and which are not, or if there are any faults in switches, transmission lines 108, or availability of transmission lines. As used herein, a system health state can be any condition that would hinder the supply of power from the primary distributor 102 to the respective district 104. For example, as shown in Table 1 and Table 2 below, which represent two different system health states, the priority for each load may change. This can be because in normal operation, a load may be used, while in an emergency, degraded mode, that same load may serve no essential or critical function (despite being housed in a critical or essential district), therefore the priority for the given load may be higher or lower given the realized system health state.

Similarly, prioritizing each of the one or more loads based on the system condition can include, in addition to system health state, prioritizing each of the one or more loads based on a flight phase or aircraft operating condition. In certain instances, some loads may only be needed during one of takeoff, cruise, landing, or on-ground. In that case, the load may have a high priority for one flight phase, while have very low, to no priority in a flight phase where the load is not needed. While not shown in the tables, a column could be added to include a priority list for each flight phase for each system health state, which may be different than the priority listed for system health state alone. The representative flight phases can include, for example, in-air, on-ground, and parked. It is possible additional flight phases may be included depending on system accuracy requirements or desires.

In embodiments, flight phase could be considered independently from the system health status but it is possible that flight phase and system health status could be combined. However, it may be the case that separate prioritization table are needed for aircraft operating mode as well (e.g., in-air, on-ground, cabin cleaning, refueling and security). If considered independently from system health status, flight phase could be added to the load management and priority tables, rather than to the power distribution tables. Similar logic processing (e.g., adaptive data programming technology) may be used here, like that used in system health status determination. While flight phase/operating mode are used herein as examples of a third variable to consider when prioritizing loads, it is possible for the third variable to be any other suitable condition as appreciated by those having ordinary skill in the art. It may also be possible to consider additional variables, beyond the three described herein, and one having ordinary skill in the art would understand how to tailor the system 100 to include additional variables without undue experimentation.

In certain cases, if a respective one or more loads 110 is not expected to be used during a certain flight phase or in a certain system health state, the method can include prioritizing the respective load 110 as non-priority such that no power is distributed to the respective load, regardless of whether the total budgeted designated current for the respective power district has been exhausted. Here, even if the distribution is based on measured load draw and the total budgeted current is not exhausted and all prioritized loads have received power, non-priority loads will still remain unpowered. This can be seen in Table 1 and Table 2 where certain loads have a blank in their respective priority column. It is important to include these loads in the tables, even if they are not prioritized because they may be turned on during other system health/aircraft mode states, or they may be turned on manually by the crew.

In embodiments, the process of budgeting currents and prioritizing loads can be performed entirely by the logic module 112, for example using predictive or adaptive logic, or the logic module 112 can receive user input for certain parameters (e.g., the budgets), where the logic module 112 can then complete the table(s) (e.g., prioritizing) based on the user input. In certain embodiments, there may be a combination of user input and computer generated inputs into the look-up tables and used by the logic module. Such information can be stored within the file(s) of the non-transitory computer readable medium. In certain embodiments, the logic module 112 can include a static engine configured to execute one or more a parameter data item files, for example one file for each table. In certain embodiments, the file(s) can include at least one of a configuration file, a parameter file, and/or a parameter data item file.

Now, turning to the examples shown in Table 1 and Table 2. In embodiments, the power distributors 102 can communicate to each of their supplied power districts 104 the amount of power they are allocated for the current system health state. The power district 104 can then use the appropriate system health state look-up table to prioritize the powering of loads 110. The next highest priority load will be powered sequentially if and only if there is enough allocated power to fully satisfy the load's budget. The next higher priority loads may be considered for powering if they require less power than what is available as well. Any loads 110 that are intentionally turned off, or have tripped, may also be considered to have zero power consumption for the purposes of reallocating available power.

Because the logic module 112 is considering both the power distribution (e.g., from each panel to the respective districts) and load management (e.g., from the power districts 104 to the respective loads 110) two types of tables can be created: primary source tables for determining power transfer, and power district load priority tables for determining load management, delineated in Table 1 and Table 2 by the outlined "spacer row". Primary source tables (e.g., below the spacer row) can contain the necessary information to define the various states of source availability. That is, the amount of power available when 1-to-n (where n is the total number of power sources on the micro-grid) sources are available, including all combinations of sources. Depending upon the micro-grid interconnect, each of the sources may feed 1-to-many power districts. Each power district 104, in turn, has tables (e.g., above the spacer row) for each overall system health state that define the priority of loads 110 within that district 104 for the system health state.

If, due to interconnect, a given power district 104 is not supplied for a given system health state, the table entries for that system health state will be blank (or zero), for example as shown in Table 1, the left and right power panels are zero because for this system health state the left and right panels are not functional. In Table 2, the center panel is zero because for this system health state, the left and right panels are fully operational, meaning the system does not need power from the center panel.

For the purposes of the example described herein, six power districts are defined: two critical districts, two essential districts, and two non-essential districts. Here, the critical districts have three primary sources, essential districts have two primary sources and non-essential districts have a single primary source. Accordingly, for a given system, there could be as many as $2^i$ tables to define all source power combinations for every possible system health state. In this example, it will be assumed that the six power districts are powered by six power sources, left, right, auxiliary power unit (APU), external generator (Ext), ram air turbine (RAT), and battery (BATT). The Left and Right sources can include main generators (e.g., engine generators). APU/Ext/RAT/BATT can be considered as a single, center panel, power source for the rest of the system (where any combination of these four being available is considered as one source available from the center panel).

For this example, the system health state as determined by the logic module 112 can therefore include at least, the following combinations: BATT Only, BATT+RAT, BATT+Ext, BATT+APU, Center+Left, Center+Right, Center+Left+Right, Left Only, Right Only, Left+Right.

Given these definitions, ten look-up tables can be generated for each power panel and each power district. Two examples are shown below in Table 1 and Table 2. Table 1 shows an example for a system health state where power is generated only via the battery and RAT (representing a theoretical worst case emergency scenario). Table 2 shows an example for a system health state where power is generated from all power panels, Center+Left+Right (representing a theoretical normal scenario with battery available from Center).

As provided in the examples, the number of loads, their priorities, and budgeted currents as shown and described below are for example and illustration purposes only and may change for a given aircraft, operator, condition, flight phase, condition of other electronics, etc.

In the example shown in Table 1, this system health state includes only a single functioning primary distributor, center power panel. In this case, power should only be sent to the critical power districts, powering loads that are critical for the aircraft to safely reach the ground. This represents a scenario in which all normal sources of electrical power (Left/Right main engine generators and the Auxiliary Power Unit generator) have failed. Hence, it is bare the minimum to allow the aircraft to make a safe landing at the nearest suitable airport. As is shown in the distribution portion of Table 1, in this system health state, only the critical power districts are prioritized and given a budget.

TABLE 1

| Load Identifier | Load Index | Priority | Budget (A) |
| --- | --- | --- | --- |
| Critical #1 Power District (assume 12 total loads for example) | | | |
| Load 1 | 1 | 5 | 5 |
| Load 2 | 2 | 2 | 2 |
| Load 3 | 3 | 10 | 5 |
| . . . | 4 | | 10 |
| . . . | 5 | 6 | 20 |
| . . . | 6 | 1 | 15 |
| . . . | 7 | | 2 |
| . . . | 8 | 7 | 10 |
| . . . | 9 | 4 | 5 |
| . . . | 10 | 8 | 5 |
| . . . | 11 | 3 | 2 |
| Load 12 | 12 | 9 | 2 |
| Critical #2 Power District | | | |
| Load 1 | 1 | 4 | 5 |
| Load 2 | 2 | 2 | 2 |
| Load 3 | 3 | | 7.5 |
| . . . | 4 | 11 | 5 |
| . . . | 5 | 5 | 20 |
| . . . | 6 | 1 | 2 |

TABLE 1-continued

| Load Identifier | Load Index | Priority | Budget (A) |
|---|---|---|---|
| ... | 7 | 8 | 5 |
| ... | 8 | 6 | 10 |
| ... | 9 | 10 | 5 |
| ... | 10 | 7 | 5 |
| ... | 11 | 3 | 5 |
| Load 12 | 12 | 9 | 2 |
| Essential #1 Power District (8 loads) | | | |
| Load 1 | 1 | | 5 |
| Load 2 | 2 | | 2 |
| Load 3 | 3 | | 5 |
| ... | 4 | | 5 |
| ... | 5 | | 2 |
| ... | 6 | | 5 |
| ... | 7 | | 10 |
| Load 8 | 8 | | 5 |
| Essential #2 Power District (8 loads) | | | |
| Load 1 | 1 | | 5 |
| Load 2 | 2 | | 10 |
| Load 3 | 3 | | 2 |
| ... | 4 | | 5 |
| ... | 5 | | 20 |
| ... | 6 | | 10 |
| ... | 7 | | 10 |
| Load 8 | 8 | | 10 |
| Non-Essential #1 Power District (4 loads) | | | |
| Load 1 | 1 | | 5 |
| Load 2 | 2 | | 10 |
| Spare #1 | 3 | | |
| Spare #2 | 4 | | |
| Non-Essential #2 Power District (4 loads) | | | |
| Load 1 | 1 | | 10 |
| Load 2 | 2 | | 10 |
| Spare #3 | 3 | | |
| Spare #4 | 4 | | |
| (spacer row) | ... | ... | ... |
| Left Power Panel | | | |
| Critical #1 | 1 | | |
| Critical #2 | 2 | | |
| Essential #1 | 3 | | |
| Non-Essential #1 | 4 | | |
| Center Power Panel | | | |
| Critical #1 | 1 | 1 | 70 |
| Critical #2 | 2 | 2 | 60 |
| Essential #1 | 3 | | |
| Essential #2 | 4 | | |
| Right Power Panel | | | |
| Critical #1 | 1 | | |
| Critical #2 | 2 | | |
| Essential #2 | 3 | | |
| Non-Essential #2 | 4 | | |

The example shown below in Table 2 represents the normal in flight scenario in which all normal sources of electrical power (e.g., Left/Right main engine generators and the Battery) are available. Therefore, in this case, all loads normally used in flight should have power available.

TABLE 2

| Load Identifier | Load Index | Priority | Budget (A) |
|---|---|---|---|
| Critical #1 Power District (assume 12 total loads for example) | | | |
| Load 1 | 1 | 5 | 5 |
| Load 2 | 2 | 2 | 2 |
| Load 3 | 3 | 10 | 5 |

TABLE 2-continued

| Load Identifier | Load Index | Priority | Budget (A) |
|---|---|---|---|
| ... | 4 | 11 | 10 |
| ... | 5 | 6 | 20 |
| ... | 6 | 1 | 15 |
| ... | 7 | | 2 |
| ... | 8 | 7 | 10 |
| ... | 9 | 4 | 5 |
| ... | 10 | 8 | 5 |
| ... | 11 | 3 | 2 |
| Load 12 | 12 | 9 | 2 |
| Critical #2 Power District | | | |
| Load 1 | 1 | 4 | 5 |
| Load 2 | 2 | 2 | 2 |
| Load 3 | 3 | 12 | 7.5 |
| ... | 4 | 11 | 5 |
| ... | 5 | 5 | 20 |
| ... | 6 | 1 | 2 |
| ... | 7 | 8 | 5 |
| ... | 8 | 6 | 10 |
| ... | 9 | 10 | 5 |
| ... | 10 | 7 | 5 |
| ... | 11 | 3 | 5 |
| Load 12 | 12 | 9 | 2 |
| Essential #1 Power District (8 loads) | | | |
| Load 1 | 1 | 1 | 5 |
| Load 2 | 2 | 6 | 2 |
| Load 3 | 3 | 8 | 5 |
| ... | 4 | 2 | 5 |
| ... | 5 | 4 | 2 |
| ... | 6 | 5 | 5 |
| ... | 7 | 3 | 10 |
| Load 8 | 8 | 7 | 5 |
| Essential #2 Power District (8 loads) | | | |
| Load 1 | 1 | 1 | 5 |
| Load 2 | 2 | 8 | 10 |
| Load 3 | 3 | 3 | 2 |
| ... | 4 | 4 | 5 |
| ... | 5 | 5 | 20 |
| ... | 6 | 6 | 10 |
| ... | 7 | 7 | 10 |
| Load 8 | 8 | 2 | 10 |
| Non-Essential #1 Power District (4 loads) | | | |
| Load 1 | 1 | 2 | 5 |
| Load 2 | 2 | 1 | 10 |
| Spare #1 | 3 | | |
| Spare #2 | 4 | | |
| Non-Essential #2 Power District (4 loads) | | | |
| Load 1 | 1 | 2 | 10 |
| Load 2 | 2 | 1 | 10 |
| Spare #3 | 3 | | |
| Spare #4 | 4 | | |
| (spacer row) | ... | ... | ... |
| Left Power Panel | | | |
| Critical #1 | 1 | 1 | 70 |
| Critical #2 | 2 | | |
| Essential #1 | 3 | 2 | 39 |
| Non-Essential #1 | 4 | 3 | 15 |
| Center Power Panel | | | |
| Critical #1 | 1 | | |
| Critical #2 | 2 | | |
| Essential #1 | 3 | | |
| Essential #2 | 4 | | |
| Right Power Panel | | | |
| Critical #1 | 1 | | |
| Critical #2 | 2 | 1 | 60 |
| Essential #2 | 3 | 2 | 72 |
| Non-Essential #2 | 4 | 3 | 20 |

A load 110 can be considered critical if it must be powered in order to fly and land the plane safely. Power districts 104 that house critical loads can be fed by at least two power sources, but often are fed by more, for example, three as shown. Examples of loads that may be in critical power districts 104 (e.g. critical districts 1 and 2) can include any one or more of, a center data concentrator, a standby indicator, a captain's transponder, taxi lights, captain's windshield heat, a center air data probe, a refuel panel, a left common computing system, a captain's VHF COM radio, a captain's primary flight display, cockpit flood lighting, a captain's NAV radio (including GPS), a left data concentrator, a standby indicator, a galley and/or food service item, a first officer (FO) transponder, a FO's windshield heat, a left attitude reference system, navigation lights, a left common computing system—backup feed, a FO VHF COM radio, an engine/multi-function display, electric trim, a FO NAV Radio, and the like.

A load 110 can be considered essential if it make the trip more comfortable or easier to complete, but may not be required to fly or land the plane. Power districts that house essential loads can be fed by at least two power sources. Examples of loads that may be in essential power districts 104 (e.g., essential districts 1 and 2) can include any one or more of, a left data concentrator, an aircraft datalink, lavatory service, a center multifunction flight display, a flight control panel #1, autopilot #1, ISS #1, SATCOM radio, and the like, a right data concentrator, cabin 115vac outlets, flight control panel #2, autopilot #2, landing lights, ISS #2, cabin lighting, a right common computing system, and the like.

A load 110 can be considered non-essential if it does not have any recognizable effect on completing the flight. Power districts that house non-essential loads can be fed by a single power source. Examples of loads that may be in non-essential power districts 104 (e.g., non-essential 1 and 2) can include any one or more of Cabin window shade control, Cabin in-flight entertainment (IFE) #1, Cabin seat control, Cabin IFE #2, spare loads, and the like.

It is possible that the loads 110 do not exactly match their respective districts, for example it is possible that a critical district can include non-essential loads. But because the loads are prioritized within the district, there is no risk that a non-essential load will receive power over a higher classified load.

Adaptive data programming can be used to write logic equations to be interpreted by flight engine. The logic equations can include information regarding each power district, each load, and the budget so that the logic module can best prioritize each load when considering the system health state, aircraft operational mode, and other desired variables. Using parameter data items and adaptive programming, once the logic equations and tables are set, there is no requirement to regression test each item in the engine, even when the logic equations change. This can save operators significant time and cost by avoiding such rigorous testing requirements to maintain certification.

Embodiments therefore provide for dynamic allocation and load management over static management. By using table driven techniques, the core software power transfer and load management engines can remain unchanged. Tables define the sources of power for each load based upon source availability, power distribution system health, and load priority. The logic to determine the state of the power system can also be captured in tables and executed by an unchanging core software engine. Industry guidance, RTCA DO-178C, provides a means by which parameter data items (PDI) can be modified without having to requalify/regression test the core engines.

Benefits associated with embodiments can include employing the described PDI approach include the ability to create "virtual busses" using software, prioritizing the loads across multiple power districts while optimizing the utilization of all available power. Moreover, this can be accomplished without having to regression test the software engines used to execute the tables and logic used to determine the system health status.

As used herein "onside" power sourcing can be defined as referring to a line that divides the aircraft into a left and right half. In theory, any fault in one half only affects that half of the aircraft while the other half can continue to function normally and continue safe flight and landing. Therefore "onside" in this context can mean that the left power sources can provide power to the left loads, and the right power sources can provide power to the right loads, while the center sources and loads can power any or receive power from any when in "onside" mode operation. However, it is possible for multiple configurations of providing power to assure electronics continue to function in the event of a power failure in their respective primary source.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A method for power distribution and load management in an aircraft, the method comprising:

budgeting a designated current for one or more loads in one or more respective power districts in a power distribution system based on a nominal load draw for each of the one or more loads;

determining a system condition of the power distribution system;

prioritizing each of the one or more loads based on the system condition;

distributing power from each of the one or more power districts to the respective one or more loads in order of priority until a total budgeted designated current for the respective power district has been exhausted, and leaving any remaining loads in the one or more power districts unpowered; and generating a look-up table for each of the one or more power districts configured to be used by a logic module to control power distribution and load management based at least in part on the look-up table, wherein the look-up table includes at least one of: a load identifier, a load indexer, a load priority based on the determined system condition, a load priority based on a flight phase, or the budgeted designated current for each of the one or more loads.

2. The method as recited in claim 1, wherein distributing power from each of the one or more power districts to the respective one or more loads in order of priority includes distributing power to a subsequent load based on an expected load draw for the respective one or more loads during the determined system condition.

3. The method as recited in claim 1, further comprising:
measuring an actual load draw for each respective load, wherein distributing power from each of the one or more power districts to the respective one or more loads in order of priority includes distributing power to a subsequent load based on the actual load draw for the respective one or more loads during the determined system condition.

4. The method as recited in claim 3, further comprising, if all prioritized loads within the respective power district receive their total respective current based on actual current needed and the total budgeted designated current for the respective power district has not been exhausted:
distributing power from each of the one or more power districts to one or more additional loads until the total budgeted designated current for the respective power district has been exhausted.

5. The method as recited in claim 1, wherein the budgeted designated current for each of the one or more loads is constant regardless of the determined system condition.

6. The method as recited in claim 1, wherein prioritizing each of the one or more loads based on the system condition includes prioritizing each of the one or more loads based on a system health state.

7. The method as recited in claim 1, wherein prioritizing each of the one or more loads based on the system condition includes prioritizing each of the one or more loads based on the flight phase.

8. The method as recited in claim 1, further comprising, if a respective load is not used during a respective system condition:
prioritizing the respective load as non-priority such that no power is distributed to the respective load regardless of whether the total budgeted designated current for the respective power district has been exhausted.

9. The method as recited in claim 1, wherein budgeting the designated current for the one or more loads and prioritizing each of the one or more loads based on the system condition are performed automatically by a computer using the logic module.

10. The method as recited in claim 9, wherein the logic module includes a static engine configured to execute one or more parameter data item files.

11. The method as recited in claim 1, further comprising:
receiving budget and priority input from a user, wherein at least one of budgeting the designated current for the one or more loads or prioritizing each of the one or more loads based on the system condition is based on the input from the user.

12. A non-transitory computer readable medium having at least one file stored therein, wherein the at least one file includes computer executable instructions configured to perform a method, the method comprising:

budgeting a designated current for one or more loads in one or more respective power districts in a power distribution system based on a nominal load draw for each of the one or more loads;
determining a system condition of the power distribution system;
prioritizing each of the one or more loads based on the system condition; and
distributing power from each of the one or more power districts to the respective one or more loads in order of priority until a total budgeted designated current for the respective power district has been exhausted;
wherein the at least one file includes one or more parameter data item files, and wherein distributing power from each of the one or more power districts to the respective one or more loads in order of priority includes distributing power to a subsequent load based on an expected load draw for the respective one or more loads during the determined system condition; and/or
wherein the method further includes measuring an actual load draw for each respective load, and wherein distributing power from each of the one or more power districts to the respective one or more loads in order of priority includes distributing power to the subsequent load based on the actual load draw for the respective one or more loads during the determined system condition; and/or
wherein the method further includes generating a look-up table for each of the one or more power districts configured to be used by a logic module to control power distribution and load management based at least in part on the look-up table, and wherein the look-up table includes at least one of: a load identifier, a load indexer, a load priority based on the determined system condition, a load priority based on a flight phase, or the budgeted designated current for each of the one or more loads.

13. An aircraft power system comprising:
one or more power distribution sources configured to supply electrical power to one or more power districts;
one or more loads housed within one or more respective ones of the one or more power districts, wherein each power district is configured to manage draw by each respective one or more loads within the respective power district; and
a logic module including machine readable instructions configured to:
budget a designated current for each of the one or more loads in the respective one or more power districts in the power system based on a nominal load draw for each of the one or more loads;
determine a system condition of the power system;
prioritize each of the one or more loads based on the system condition; and
distribute power from each of the one or more power districts to the respective one or more loads in order of priority until a total budgeted designated current for the respective power district has been exhausted, wherein the logic module is configured to generate a look-up table for each of the one or more power districts to control power distribution and load management based at least in part on the look-up table, and wherein the look-up table includes at least one of: a load identifier, a load indexer, a load priority based on the determined system condition, a load priority based on a flight phase, or the budgeted designated current for each of the one or more loads.

14. The system as recited in claim 13, wherein the logic module includes a static engine configured to execute one or more parameter data item files.

15. A method for power distribution and load management in an aircraft, the method comprising:
- budgeting a designated current for one or more loads in one or more respective power districts in a power distribution system based on a nominal load draw for each of the one or more loads;
- determining a system condition of the power distribution system;
- prioritizing each of the one or more loads based on the system condition; and
- distributing power from each of the one or more power districts to the respective one or more loads in order of priority until a total budgeted designated current for the respective power district has been exhausted, and leaving any remaining loads in the one or more power districts unpowered, wherein distributing power from each of the one or more power districts to the respective one or more loads in order of priority includes distributing power to a subsequent load based on an expected load draw for the respective one or more loads during the determined system condition.

16. A method for power distribution and load management in an aircraft, the method comprising:
- budgeting a designated current for one or more loads in one or more respective power districts in a power distribution system based on a nominal load draw for each of the one or more loads;
- determining a system condition of the power distribution system;
- prioritizing each of the one or more loads based on the system condition; and
- distributing power from each of the one or more power districts to the respective one or more loads in order of priority until a total budgeted designated current for the respective power district has been exhausted, and leaving any remaining loads in the one or more power districts unpowered, wherein prioritizing each of the one or more loads based on the system condition includes prioritizing each of the one or more loads based on a system health state.

17. A method for power distribution and load management in an aircraft, the method comprising:
- budgeting a designated current for one or more loads in one or more respective power districts in a power distribution system based on a nominal load draw for each of the one or more loads;
- determining a system condition of the power distribution system;
- prioritizing each of the one or more loads based on the system condition; distributing power from each of the one or more power districts to the respective one or more loads in order of priority until a total budgeted designated current for the respective power district has been exhausted, and leaving any remaining loads in the one or more power districts unpowered; and
- if a respective load is not used during a respective system condition, prioritizing the respective load as non-priority such that no power is distributed to the respective load regardless of whether the total budgeted designated current for the respective power district has been exhausted.

* * * * *